US010331921B2

(12) United States Patent
Grimaux (10) Patent No.: US 10,331,921 B2
(45) Date of Patent: *Jun. 25, 2019

(54) EVENT BASED INTERROGATION ZONE TRACKING SYSTEM FOR PRODUCT SAMPLES

(71) Applicant: INTELLITIX TECHNOLOGIES INC., Montreal, Quebec (CA)

(72) Inventor: Serge Grimaux, Prague (CZ)

(73) Assignee: Intellitix Technologies, Inc., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/802,608

(22) Filed: Nov. 3, 2017

(65) Prior Publication Data

US 2018/0053025 A1 Feb. 22, 2018

Related U.S. Application Data

(63) Continuation of application No. 14/946,287, filed on Nov. 19, 2015, now Pat. No. 9,836,627.

(Continued)

(51) Int. Cl.
*G06K 7/00* (2006.01)
*G06K 7/10* (2006.01)
(Continued)

(52) U.S. Cl.
CPC .......... *G06K 7/10366* (2013.01); *F24F 11/30* (2018.01); *G05B 13/048* (2013.01);
(Continued)

(58) Field of Classification Search
CPC ........ G06K 19/07762; G06K 7/10366; G06K 7/0008; G06K 7/10227; G06K 2017/0045;
(Continued)

(56) References Cited

U.S. PATENT DOCUMENTS

2008/0249899 A1* 10/2008 Nasser ................. G06Q 10/087
705/28
2011/0285502 A1* 11/2011 Steinmetz ............ G06K 7/0008
340/5.61

(Continued)

*Primary Examiner* — Mirza F Alam
(74) *Attorney, Agent, or Firm* — White and Williams LLP (57) ABSTRACT

The invention provides a temporary installation of a system of RFID-based terminals and user-worn RFID devices within an event interrogation zone. At an event, terminals are located within, and associated with, vendor booths erected in the interrogation zone. User RFID devices are issued to users wishing to enter the interrogation zone. Each user RFID device includes an element worn by the user, and an attached or embedded RFID tag with a stored unique UserID. Products for sampling have unique ProductIDs. The terminals are programmed for: (1) retrieving the UserID when the user enters the vendor booth; (2) retrieving a ProductID of a product sampled by the user; and (3) retrieving the UserID when the user leaves the vendor booth. The UserID and timestamps of entry, departure, and ProductIDs of products sampled are communicated to a server. The system allows tracking of products sampled and user behavior during an event.

15 Claims, 7 Drawing Sheets

Related U.S. Application Data (60) Provisional application No. 62/082,348, filed on Nov. 20, 2014.

(51) Int. Cl.
| | | |
|---|---|---|
| *G05B 15/02* | (2006.01) | |
| *F24F 11/30* | (2018.01) | |
| *G06Q 10/08* | (2012.01) | |
| *G05B 13/04* | (2006.01) | |
| *F24F 110/00* | (2018.01) | |
| *F24F 110/10* | (2018.01) | |
| *F24F 130/00* | (2018.01) | |
| *F24F 130/10* | (2018.01) | |
| *G06K 19/077* | (2006.01) | |

(52) U.S. Cl.
CPC ........... *G05B 15/02* (2013.01); *G06K 7/0008* (2013.01); *G06Q 10/087* (2013.01); *F24F 2110/00* (2018.01); *F24F 2110/10* (2018.01); *F24F 2130/00* (2018.01); *F24F 2130/10* (2018.01); *G05B 2219/2642* (2013.01); *G06K 19/07762* (2013.01)

(58) Field of Classification Search
CPC ........... G06Q 10/087; G06Q 10/06312; G06Q 30/0261; G08B 13/2402
See application file for complete search history.

(56) References Cited

U.S. PATENT DOCUMENTS

| | | | |
|---|---|---|---|
| 2012/0084135 A1* | 4/2012 | Nissan | G06Q 30/0238 705/14.38 |
| 2012/0111950 A1* | 5/2012 | Worrall | G06K 19/07762 235/488 |
| 2012/0313759 A1* | 12/2012 | Markwitz | G06Q 10/087 340/10.1 |
| 2014/0278688 A1* | 9/2014 | Sullivan | G06Q 10/06312 705/7.22 |
| 2015/0348384 A1* | 12/2015 | Tam | G06K 7/10128 340/572.1 |

* cited by examiner

EVENT BASED INTERROGATION ZONE TRACKING SYSTEM FOR PRODUCT SAMPLES

CROSS-REFERENCE TO RELATED APPLICATIONS

This application is a continuation of U.S. Non-Provisional patent application Ser. No. 14/946,287 filed Nov. 19, 2015, entitled "Event Based Interrogation Zone Tracking System for Product Samples," which claims the benefit of U.S. Provisional Patent Application No. 62/082,348 filed Nov. 20, 2014, entitled "System and Method of IntelliCommerce," the contents of which are incorporated herein by reference in their entirety.

FIELD OF INVENTION

The invention is generally related to systems for tracking consumer behaviour, and more particularly relates to the use of RFID tags in such systems.

BACKGROUND

The festival industry is booming and is providing a fertile ground for vendors to showcase and offer sampling opportunities to their customer base. Such temporary events are proving to be attractive marketing campaigns for the vendors looking to increase their customer base and introduce new consumers to their products by offering an opportunity to sample various items.

A festival is an event ordinarily staged by a community, centering on and celebrating some unique aspect of that community and its traditions, often marked as a local or national holiday. Festivals often serve to meet specific purposes, especially in regard to commemoration and/or celebration. A festival provides an opportunity for people to come together and celebrate while also partaking in entertainment.

A food festival is an event celebrating food or think. A food festival usually highlights the output of producers from a certain region. Some food festivals are focused on a particular type of food item. There are also specific beverage festivals, such as the famous Oktoberfest in Germany for beer. Many cities hold festivals to celebrate wine or other produce from local producers.

A fair is a gathering of people to display or trade produce or other goods, to parade or display animals and often to enjoy associated entertainment like a circus or joy rides. Festivals and fairs are normally temporary in nature; some last only an afternoon while others may last a few days.

Since the nature of festivals and fairs is temporary and the vendors participating in these events are generally small local vendors who have limited to no technology at their disposal; consumer information gathering at such events is not possible.

Festivals and fairs require small cash transactions. This is particularly true of festivals and fairs centred around food or drinks, where users are encouraged to sample a wide variety of items from different vendors. Thus consumers are required to keep a lot of cash or coins on hand to make these small transactions which can be very inconvenient. Similarly for the vendors, it takes a lot of time to complete a sale when dealing with small cash/coin based transactions, since they must count the cash amount handed by the consumer and provide the exact change back to the consumer. The vendors must also ensure that they don't run out of change. When closing the day for sales, all cash must be counted, added and taken safely to be deposited at a bank or other financial institution.

To compound this problem, consumers have steadily been moving away from cash based transactions as they don't want to have the hassle of carrying cash and coins which can also be easily lost in the rush of a festival. Touchless and cashless transaction methods have emerged that provide convenience and save time. Such touchless and cashless transactions may for example use credit cards or other devices embedded with RFID (Radio-frequency identification) tags. RFID tags allow for a "tap and go" style of payment because the information is transmitted wirelessly. Two-way radio transmitter-receivers called "readers" send a signal to the tag and read its response. In such a transaction the user is not required to sign a piece of paper or to enter the PIN number, and neither there is any verification of signature.

Radio-frequency identification (RFID) is the wireless non-contact use of radio-frequency electromagnetic fields to transfer data, for the purposes of automatically identifying and tracking tags attached to objects. The tags contain electronically stored information. Some RFID tags are powered by and read at short ranges (a few centimeters) via electromagnetic induction. Other types of RFID tags may use a local power source such as a battery, or else have no battery but collect energy from the interrogating electromagnetic field, and then act as a passive transponder to emit microwaves or UHF (ultra high frequency) radio waves. Unlike a bar code, the RFID tag does not necessarily need to be within line of sight of the reader, and may be embedded in an object.

RFID tags can be passive or active or battery-assisted passive. A passive tag is cheaper and smaller because it has no battery. An active tag has an on-board battery and periodically transmits its ID signal. A battery-assisted passive (BAP) tag has a small battery on board and is activated when in the presence of an RFID reader.

Tags may either be read-only, having a factory-assigned serial number that is used as a key into a database, or may be read/write, where object-specific data can be written into the tag by the system. Field programmable tags may be write-once, read-multiple; "blank" tags may be written with an electronic product code by the user.

Generally fixed RFID readers are set up to create a specific interrogation zone which can be tightly controlled. This allows a highly defined reading area for when tags go in and out of the interrogation zone. Mobile RFID readers may be hand-held or mounted on carts or vehicles.

Despite advances in the technology, prior methods have various shortcomings, including a lack of information gathering about consumer sampling at a festival or fair. Since the duration of a festival or fair is so brief, conventional methods for setting up and collecting consumer behaviour information are not suitable or may cost too much to provide a meaningful business benefit. Thus consumer information is neither collected nor compiled in real time to be useful due to the brevity of the event. Thus a wholesale change is needed in the way brands and/or vendors and/or manufacturers (distributors, event organizers, exhibitors, etc.) engage with their audience from basic entry all the way to post event communication and data mining.

Prior methods used at fairs and festivals to link consumers to vendors use analog and manual ways such as the distribution of coupons, vouchers, business cards, flyers, etc. at the time of registration. Typically consumers attending such events are given a welcome bag that contains many of the aforementioned and other promotional items. Such methods are outdated as they are bulky, expensive and environmentally unfriendly.

It would be desirable to provide a tracking system for product sampling at events that uses RFID technology within an interrogation zone.

SUMMARY

Broadly speaking, the present invention relates to a system and method of collection and use of consumer data utilizing RFID tags embedded in wristbands or similar wearable items that can be advantageously used in events that are inherently brief in nature for example festivals and fairs. Such tags may also be used for electronic touchless payments. This would replace the prior manual and analog methods of information collection at fairs and festivals with digital methods utilizing RFID tags, with the aim of stimulating commercial transactions between the vendors and the consumers after the event is over. The commercial benefits can thus continue long after the event, as the consumer can acquire products from the manufacturers, brands, distributors, event organizers, exhibitors, etc. who were participating at the event.

Through the RFID technology, festival goers are able to engage with the vendors during and after the event. The RFID cashless payment systems also encourage consumers to spend more since it is convenient, transaction processing is faster and carrying cash is not a requirement for purchasing and sampling.

In the preferred embodiment the system and method collects and compiles data using RFID tags during any event that is brief in nature e.g. a fair or a festival. The information is gathered in real time via the RFID wristbands or other RFID wearable items.

For example, one such wearable device is disclosed in U.S. patent application Ser. No. 14/717,234 filed May 20, 2015 by the same applicant (Wearable RFID Device for Use in an Event-Based Interrogation Zone), the disclosure of which is incorporated herein by reference. In such an embodiment the initial state of the sales terminal is an inactive state. When the consumer taps the RFID tag to the RFID reader, the RFID reader reads the RFID tag which activates the sales terminal. In one embodiment of the invention the sales terminal is only activated once a valid RFID tag has been tapped at the RFID reader by a consumer. This prevents a sales person from fraudulently adding any items unwanted by the consumer to the order. The system checks the validity of the RFID tag by comparing the UserID of the RFID tag with the UserIDs stored in the database on the server. If the RFID tag is valid a sales person is then allowed to add products being vended to the sales transaction. Once a consumer confirms the sale transaction with a second tap of the RFID tag to the RFID reader, the system validates the RFID tag a second time by comparing the UserID of the RFID tag captured with the first tap with the UserID of the RFID tag captured with the second tap. Only when the UserIDs of both the RFID tag taps are the same is the sales transaction completed by transferring funds from the RFID tag to the vendor (sales merchant). With the completion of the sales transaction the sales terminal returns to an inactive state.

In a preferred embodiment an RFID tag may be embedded in a wristband that is given to a consumer when visiting a certain event e.g. a fair or a festival. Each RFID tag has a unique UserID associated with it.

Likewise, each vendor participating in the event may be provided with a unique ID (VendorID), and unique ProductIDs may be provided for each of the products that a vendor may be offering for sampling at the event.

Real time information can be gathered using RFID wristbands. For example, each time a consumer enters a booth, samples or purchases one or more products and then leaves the booth, information may be gathered as to when consumer entered a booth, what products were sampled or purchased in what order they were sampled or purchased, and when the consumer left the booth.

For example when the consumer visits a booth e.g. a wine tasting tooth of a winery at a wine and cheese festival that is being held over a weekend the RFID wristband UserID may be captured and saved to the server. The VendorID may be saved to the RFID wristband of the consumer. The ProductIDs of the products sampled and purchased by the consumer at this booth may also be captured and saved to the RFID wristband and the server. When the consumer leaves the wine tasting booth, the UserID may be captured from the RFID wristband and saved to the server; while the VendorID may be saved to the RFID wristband of the consumer.

Similarly when the consumer visits a second and a third booth the RFID UserID and timestamps are captured at arrival and departure of the consumer to these booths; and the ProductIDs of the products sampled and purchased at the second and third booth are also captured and saved to the RFID wristband and the server.

In one embodiment the ProductIDs are saved to the server and saved to the RFID wristband of the consumer. In an alternate embodiment the ProductIDs and the VendorID are both saved to the server and the RFID wristband of the consumer.

Gathered information about the consumer's visits to different booths during an event may be compiled which includes information about the products purchased or sampled at each of the booths visited by the said consumer. Such compiled information may be shared with a vendor e.g. send the said vendor the information about how many consumers visited the booth of the vendor and what products were purchased and sampled. Compiled information may also be shared with each consumer so that they have a record of their visit to different booths and which products they purchased and sampled at each.

The venue of a fair or a festival may be setup with one or more sales terminals with RFID readers, one or more RFID top-up terminals with RFID readers and a connected server that stores the UserIDs of the RFID tags, associated balances, age information, zone restriction/privileges information. The server is accessible by the sales terminals and the top-up terminals over a network for example a local area network (LAN).

There may be an option to add a balance in advance of attending the event. For example, at the time of registration a consumer may opt to add $100 that can then be used via the RFID tag to purchase different items being vended at the event. Thus when the consumer arrives at the event and is given the RFID wristband it includes a privilege to spend $100 at the different sales areas setup at the venue.

One or more terminals may be provided at the venue that are dedicated for RFID tag top-up. The consumer may first be able to check the balance on their RFID wristband by tapping the RFID tag at the RFID reader associated with the top-up terminal. The consumer may add more balance to the RFID tag for later use. The RFID top-up terminal may be self-serve or the consumer may be assisted by an operator. In either case when a consumer tops-up the RFID tag with more balance, the consumer is required to confirm the transaction with a second tap of the RFID tag to the reader of the RFID tag top-up terminal.

Optionally, the RFID tag may also be used to verify the age of the bearer. For example an event like a fair or a festival may have products or services for purchase or sampling that are age restricted e.g. sale of alcohol at a booth set up by a local winery. Thus it may be important to check the age of a consumer before the sale/sampling of an alcoholic beverage. The RFID tag may preferably contain the age or date of birth information of the consumer. Alternatively the server may also store this information so that when an RFD tag is read by the RFID reader at the sales terminal in the bar, the age is verified before allowing a sales person to add any products to the sales transaction. The age verification may be done by using the UserID of the RFID tag, connecting to the server and querying the server for the age information before allowing a sales person to add any age restricted products to the sales transaction.

A similar process may be used to check the zone restrictions/privileges associated with the RFID tag. For example an event like a fair or a festival may be divided into one or more zones. The various zones may be required in order to segregate the consumers based on their roles (e.g. press or staff credentials, or a "backstage" pass) or payment levels (e.g. gold vs. silver admission packages).

According to a first aspect of the invention, a temporary installation of a system of RFID-based terminals and user-worn RFID devices is provided within an event interrogation zone. A plurality of terminals is provided that is located within, and associated with, a plurality of vendor booths erected in the interrogation zone. Each terminal has an active RFID reader, and is in communication with a server. A plurality of user RFID devices is issued to users wishing to enter the interrogation zone. Each user RFID device includes an element worn by a user, and an attached or embedded RFID tag having stored data representing a unique UserID. At least one product is provided for sampling in at least one of the vendor booths. Each product has a unique ProductID. Each terminal is programmed for: (1) retrieving the UserID of a user upon entry into the vendor booth and communicating that UserID and an entry timestamp to the server; (2) retrieving a ProductID of a product sampled by the user in the vendor booth and communicating that ProductID, with an associated UserID, and a sampling timestamp, to the server; and (3) retrieving the UserID of the user upon departure from the vendor booth and communicating that UserID and a departure timestamp to the server.

Retrieving a UserID of a user may include receiving a tap or scan of the user RFID device at a terminal, such that the RFID tag communicates its stored UserID to the terminal.

ProductID information may be acquired in any of several ways. In one embodiment, each product has an associated product RFID device having an RFID tag on which the ProductID is stored. In this case, the terminal may be programmed for retrieving the ProductID by receiving a tap or scan of the product RFID device at a terminal, such that the RFID tag communicates its stored ProductID to the terminal.

In another embodiment, each terminal is associated with a single product. In this case, the ProductID of a sampled product is retrieved by inference when a user RFID device is tapped or scanned at the terminal. That is to say, the terminal already has in memory its associated ProductID, and this can be communicated to the server and/or the user RFID device when the user RFID device is tapped or scanned.

In yet another embodiment, retrieving a ProductID includes receiving a selection of a product from a GUI on a display of the terminal before or after a user taps or scans the user's RFID device at the terminal, the selected product on the GUI being associated with a stored ProductID on the terminal. The selection of the product from the GUI causes the ProductID to be retrieved from a local or remote database and this can be communicated to the server and/or the user RFID device when the user RFID device is tapped or scanned.

Entry and exit terminals may also be provided that are installed proximate to controlled entry and exit points of the interrogation zone. Each entry/exit terminal has an active RFID reader, and is in communication with a server. The entry/exit terminals are programmed for: (1) retrieving the UserID of a user upon entry into the interrogation zone and communicating that UserID and an entry timestamp to the server; and (2) retrieving the UserID of the user upon departure from the interrogation zone and communicating that UserID and a departure timestamp to the server.

Various types of records may be generated from the gathered data. The server may store a timestamped record of products sampled by a user while in the interrogation zone. The server may store a timestamped record of vendor booths visited by a user while in the interrogation zone. The server may store a timestamped record of products sampled by a plurality of users according to vendor. The server may store a timestamped record of products sampled by a plurality of users in the interrogation zone.

The server may be programmed for sending a message to the user relating to at least one of the products sampled, or at least one of the vendors visited. This message may include a list of products sampled or vendors visited. This message may also include an offer of further information about a product or vendor, or a product offer.

The terminal may be further programmed for receiving a user rating of a product sample (e.g. through a GUI on a display of the terminal). Such user ratings may also be compiled for the benefit of the user (e.g. "Here are the wines you liked best today.") or the vendor (e.g. "Here are the top-rated samples today.") This information may also be compiled for the event organizer to assist in planning for future years' events.

The record of visits to a vendor (with timestamped sampling and user information) is preferably communicated to the associated vendor.

The record of visits to multiple vendors (with timestamp and user information) preferably communicated to an event organizer.

The stored data may also include at least one credential. For example, the credential may be an age or date of birth credential, or an access or privilege credential. The credential may be checked by the terminal upon retrieval of the UserID on entry. In this case, the terminal may be programmed for communicating an indication that the user should be denied entry into the vendor booth if an appropriate credential is lacking. The credential may also, or in the alternative, be checked by the terminal upon retrieval of the UserID prior to the user attempting to sample a product. In this case, the terminal may be programmed for communicating an indication that the user should be denied access to the product sample if an appropriate credential is lacking. The vendor booth may include an age-restricted product, such as an alcoholic beverage.

According to a second aspect of the invention, a wearable RFID device is provided for use in an event-based interrogation zone. The zone contains RFID-based terminals, each terminal being located within the interrogation zone. Each terminal has an active RFID reader, and is in communication with a server. The device includes an element worn by a user; and an attached or embedded RFID tag having stored data representing a unique UserID associated with the user. The tag is programmed for activating an otherwise inactive one of said terminals upon presentation of the tag to the RFID reader of said terminal in a tap or scan, and communicating the UserID to the terminal. Following a retrieval of a ProductID by the terminal of a product for sampling by the user, the tag is programmed for receiving from the terminal a communication of the ProductID and an associated sampling timestamp for storage in the stored data on the tag.

The stored data may also include a stored funds balance. In this case, the tag may be further programmed, following a second tap or scan of the tag at the terminal, for having its stored funds balance changed by the amount of a transaction run through the terminal for the product to be sampled.

DETAILED DESCRIPTION

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation.

It should also be understood that many components and items are illustrated and described as if they were hardware elements. However, in at least one embodiment, the components comprised in the method and tool are actually implemented in software.

The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. In order to provide a context for the various aspects of the disclosed invention, as well as the following discussion are intended to provide a brief, general description of a suitable environment in which the various aspects of the disclosed invention may be implemented. While the invention has been described in the general context of computer-executable instructions of a program that runs on one or more computers, those skilled in the art will recognize that the invention also may be implemented in combination with other program modules. Generally, program modules include routines, programs, components, data structures, etc. that perform particular tasks and/or implement particular abstract data types. Moreover, it will be appreciated that the system and method may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch or other electronic gadgets incorporating the capacity to compute), microprocessor-based or programmable consumer or industrial electronics, and the like. The illustrated aspects may also be practiced in distributed computing environments where tasks/routines/processes etc. are performed by remote processing devices that are linked through a communications network e.g. a local area network (LAN) or the Internet. However, some, if not all aspects of the invention may be practiced on stand-alone computer(s). In a distributed computing environment, program modules may be located in both local and remote memory storage devices.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages. Additionally computer code may also be written using a web programming stack of software, which may mainly be comprised of open source software, usually containing an operating system, Web server, database server, and programming language. Some embodiments may use well-known open-source Web development platforms using Linux, Apache, MySQL and PHP. Other examples of environments and frameworks using which computer code may also be generated are Ruby on Rails which is based on the Ruby programming language, or node.js which is an event-driven server-side JavaScript environment. In the present case, the code is specialized to execute functions described herein which enable a smoother and more efficient technological process.

Computing devices e.g. terminals or readers that enable a user to engage with the invention in general may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.).

An application or an app or other simulation may be stored on a storage media such as a USB memory key, flash memory, or other type of memory media all collectively referred to as "removable media" in this disclosure. The app may also be downloaded from the internet. The removable media can be inserted to the console of a computing device where it is read. The console can then read program instructions stored on the removable media and present a user interface to the user. The user interface may preferably be a graphical user interface (GUI).

Figure 1:
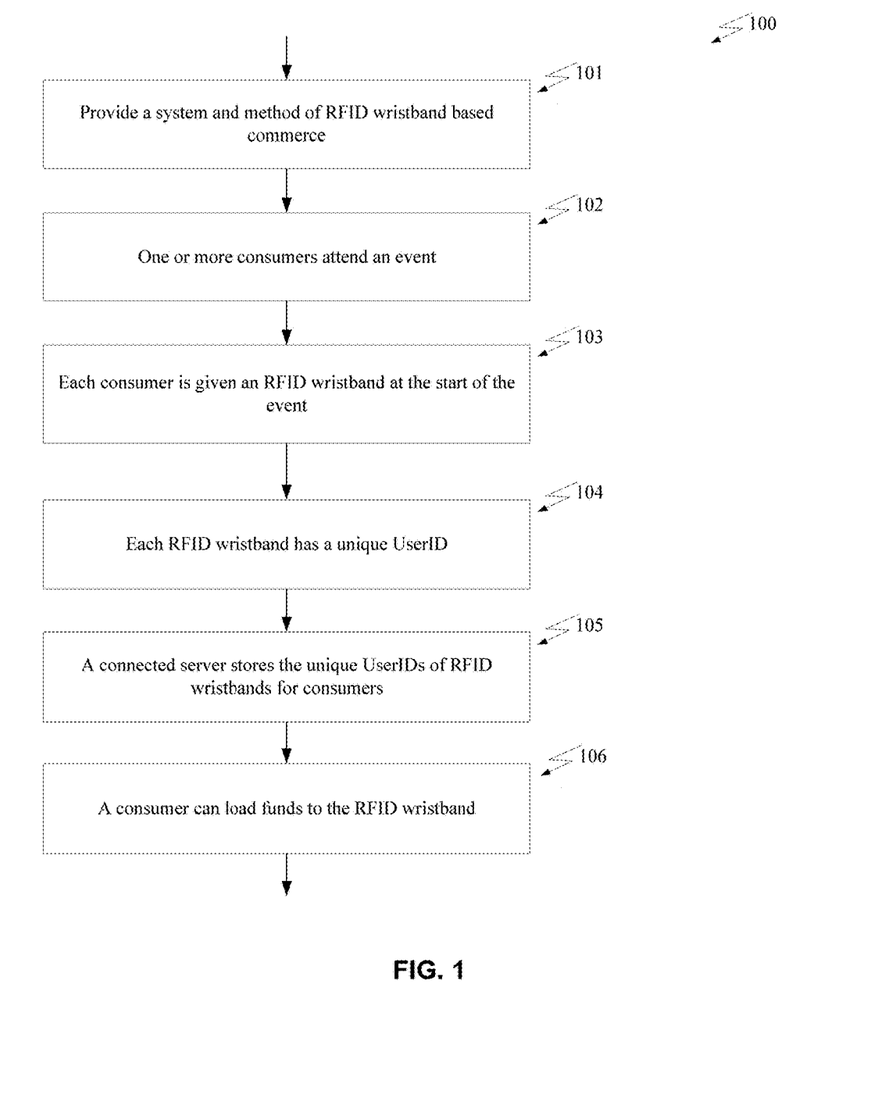
FIG. 1 is a flow diagram illustrating a basic method for issuance and use of wristbands for an event.

FIG. 1 shows a preferred embodiment 100. A system and method is provided of RFID wristband based sample tracking and related commercial transactions 101. The system and method allows for electronic touchless, cashless payments that utilize RFID tags embedded in wristbands or similar wearable items. The system and method may be implemented with an RFID tag embedded in a wristband or a similar wearable item and is given to a consumer when visiting a certain event e.g. a festival or fair at which products are available for sampling.

Purchasing transactions may also be done using RFID tags embedded in wristbands. For example, one such system is disclosed in U.S. patent application Ser. No. 14/717,234 filed May 20, 2015 by the same applicant (Wearable RFID Device for Use in an Event-Based Interrogation Zone), the disclosure of which is incorporated herein by reference. In such an embodiment the initial state of the sales terminal is an inactive state. When the consumer taps the RFID tag to the RFID reader, the RFID reader reads the RFID tag which activates the sales terminal. The sales terminal is only activated once a valid RFID tag has been tapped at the RFID reader by a consumer. This prevents a sales person from fraudulently adding any items unwanted by the consumer to the order. The system checks the validity of the RFID tag by comparing the UserID of the RFID tag with the UserIDs stored in the database on the server. If the RFID tag is valid, only then can a sales person add products to the sales transaction. Once the consumer confirms the sale transaction with a second tap of the RFID tag to the RFID reader, the system validates the RFID tag a second time by comparing the UserID of the RFID tag captured with the first tap with the UserID of the RFID tag captured with the second tap. Only when the UserIDs of the two RFID tag taps are the same is the sales transaction completed by transferring funds from the RFID tag to the sales merchant. With the completion of the sales transaction the sales terminal returns to an inactive state. The second tap of the RFID tag to the RFID reader confirms the consumer's intent and willingness to purchase the products/services being vended. This eliminates the accidental RFID scan loophole that may be used by a consumer later to claim a chargeback.

One or more consumers attend an event 102, such as a wine and cheese festival.

Each consumer is given an RFID wristband at the start of the event 103.

Each RFID wristband has a unique UserID 104. This may be keyed to other information about the user (name and address, phone number, email, social media particulars, date of birth, etc.) which is stored on the wristband, or is queryable from local or remote storage.

A connected server stores the unique UserIDs of RFID wristbands for consumers 105. The connected server is accessible over a network e.g. a LAN or a WAN or over the internet.

A user can load funds to the RFID wristband 106. There may be an option to load funds/add a balance in advance of attending the event. For example, at the time of registration a consumer may opt to add $100 that can then be used via the RFID tag to sample or purchase differ products being showcased at the event. Thus when the consumer arrives at the fair or festival and is given the RFID wristband it includes a privilege to spend $100 at the different sales booths setup at the venue.

The venue/event may be setup with one or more sales terminals with RFID readers, one or more RFID top-up terminals with RFID readers and a connected server that stores the UserIDs of the RFID tags, associated balances, age information, zone restriction/privileges information etc. The server is accessible by the sales terminals and the top-up terminals over a network for example a local area network (LAN).

The system may use standardized RFID tags (ICODE SLI2 15693 on 13.56 MHz (HF)), the most common tag type for inventory tracking.

RFID tags contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory. The RFID tag includes either a chip-wired logic or a programmed or programmable data processor for processing the transmission and sensor data, respectively.

Such RFID tags have a memory which has two sectors: the ROM (read only memory) and the R/W (read/write) memory. The ROM is to store the UserID (also known as UID) of the RFID tag, this information is burnt to the ROM at the time of manufacturing and cannot be changed later. The second sector of the memory is a R/W memory, here transactional information is stored e.g. information such as balance, one or more previous transactions, zone restrictions, age limit, etc. Such information may be preferably stored in an encrypted format. The preceding list of items stored on the RFID tag is exemplary and the invention is not limited to these examples.

An RFID reader transmits an encoded radio signal to interrogate the RFID tag. The RFID tag receives the message and then responds with its identification and other information. This may be only a unique tag serial number, or may be product-related information such as a stock number, lot or batch number, production date, or other specific information. In case of the double tap payment method, the balance is written to the RFID tag in addition to some other information like balance, age limit and zone restrictions etc.

Signalling between the reader and the RFID tag can be done in several different ways, depending on the frequency band used by the RFID tag. RFID tags operating on LF (Low Frequency) and HF (High Frequency) bands are, in terms of radio wavelength, very close to the reader antenna because they are only a small percentage of a wavelength away. An RFID tag is electrically coupled with the transmitter in the reader. The RFID tag can modulate the field produced by the reader by changing the electrical loading the tag represents. By switching between lower and higher relative loads, the RFID tag produces a change that the RFID reader can detect. At UHF (Ultra High Frequency) and higher frequencies, the RFID tag is more than one radio wavelength away from the reader, requiring a different approach.

When written into the RFID tag by an RFID printer, the tag contains a 96-bit string of data. The first eight bits are a header which identifies the version of the protocol. The next 28 bits identify the organization that manages the data for this tag; the organization number is assigned by the EPC-Global consortium. The next 24 bits are an object class, identifying the kind of product; the last 36 bits are a unique serial number for a particular tag. These last two fields are set by the organization that issued the RFID tag. Similar to a URL, the total electronic product code number can be used as a key into a global database to uniquely identify a particular product (or in this case, a unique user/bearer of the device).

Generally, the read range of an RFID tag is limited to the distance from the reader over which the tag can draw enough energy from the RFID reader field to power the tag. RFID tags may be read at longer ranges than they are designed for by increasing reader power.

In the present case, the sales terminal is only activated once a valid RFID tag has been tapped at the RFID reader by a consumer. This prevents a sales person from fraudulently adding any items unwanted by the consumer to the order.

The sales terminal may also be activated when a non-valid tag is tapped, and it may display a message "invalid tag".

Figure 2:
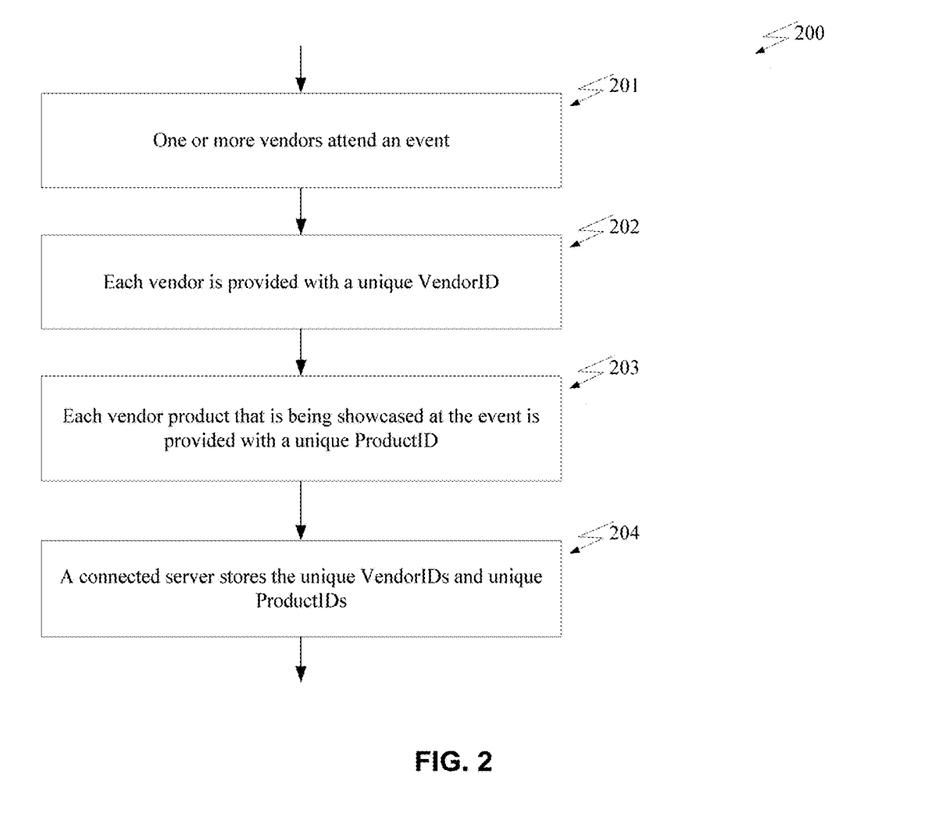
FIG. 2 is a flow diagram illustrating the use of VendorID and ProductID codes.

FIG. 2 shows one embodiment 200. One or more vendors attend an event 201, such as for example, multiple wineries participating in a wine and cheese festival that lasts over a long weekend.

Each vendor is provided with a unique VendorID 202.

Each vendor product that is being showcased at the event is provided with a unique ProductID 203. Since each vendor may have multiple wines, cheeses and other products that they are showcasing to the consumers attending the festival, each VendorID may be associated with multiple ProductIDs.

A connected server stores the unique VendorIDs and unique ProductIDs 204. The connected server is accessible over a network e.g. a Local Area network (LAN) or a Wide Area Network (WAN) or over the internet. The unique VendorIDs and unique ProductIDs may be stored in a database or a file.

Figure 3:
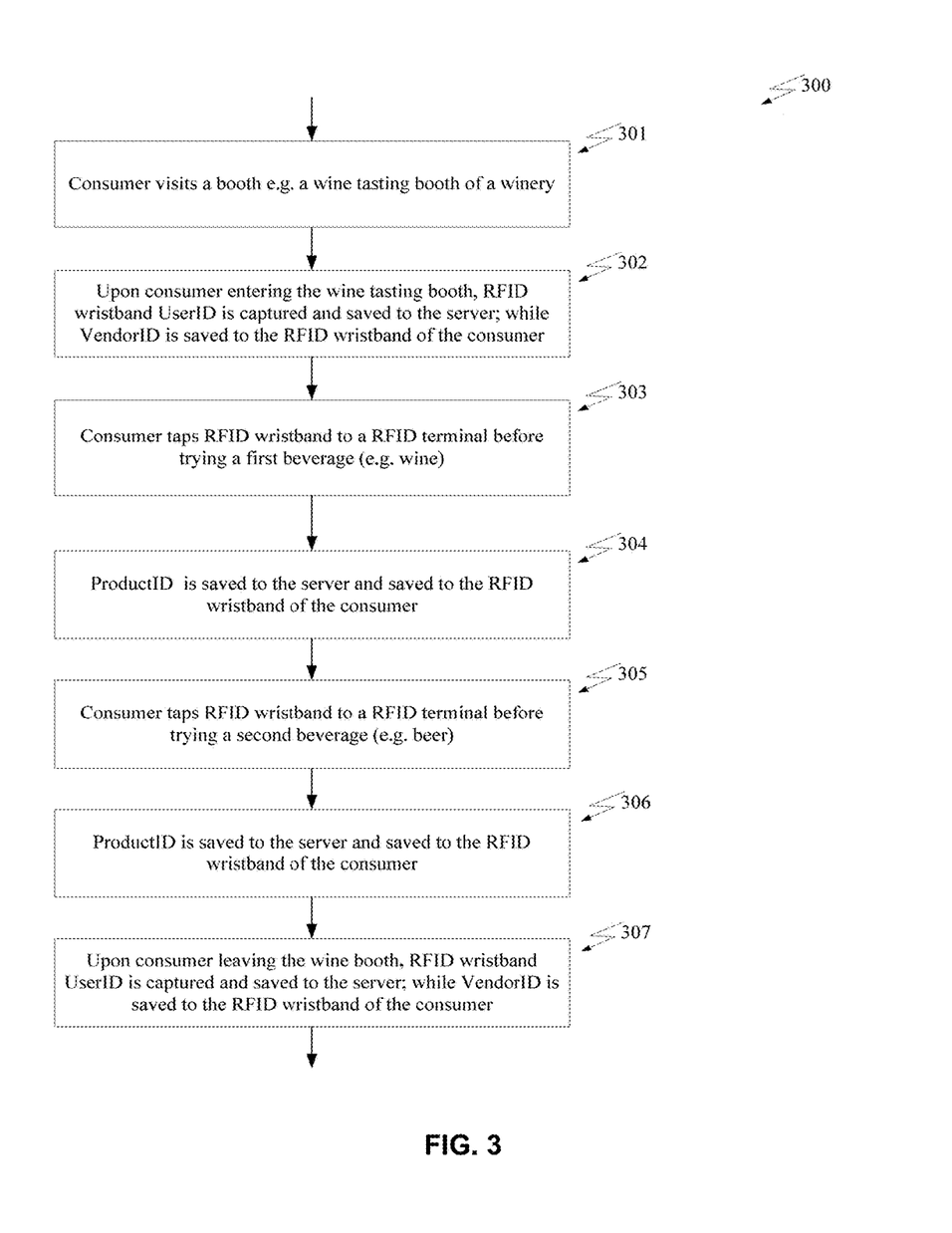
FIG. 3 is a flow diagram illustrating the use of RFID wristbands in the course of sampling a product in a vendor booth.

FIG. 3 shows one embodiment 300. Consumer visits a booth e.g. a wine tasting booth of a winery 301.

Upon consumer entering the wine tasting booth, RFID wristband UserID is captured (by being read by a nearby terminal) and the UserID is saved to the server; while the associated VendorID of the booth is saved to the RFID wristband of the consumer 302.

The consumer taps the RFID wristband to a RFID terminal before trying a first beverage (e.g. wine) 303. Other checks and verifications may also be performed in the background. For example an event like a fair may have products or services for sale or sampling that are age restricted e.g. alcohol. Thus it may be important to check the age of a consumer before the sale of an alcoholic beverage. The age of the consumer may be checked using user data stored on the RFID tag on the wristband, or keyed to the UserID stored on the wristband, before allowing the sale of an age restricted product to go through.

One embodiment may advantageously use the double tap RFID transaction method where a first tap of the RFID tag activates the sales terminal and allows the sales person to add the vended products to the sales transaction and a second tap of the RFID tag completes the sales transaction. For the sake of brevity, these steps are omitted from the detailed description that follows.

The RFID tag may preferably contain the age or date of birth information about the consumer. Alternatively the server may also store this information so that when an RFID tag is read by the RFID reader at the sales terminal the age is verified before allowing a sales person to add any products to the sales transaction. The age verification may be done by using the UserID of the RFID tag, connecting to the server and querying the server for the age information before allowing a sales person to add any age restricted products to the sales transaction.

The server may preferably store the age or date of birth information about the consumer, so that when an RFID tag is read by the RFID reader at the sales terminal the age can be verified before allowing a sales person to add any age restricted products to the sales transaction. Alternatively the RFID tag and the server both may store the age and date of birth information about the consumer.

Thus if the bearer of the RFID tag is not over the age limit the terminal may optionally display a notification and disallow a sales person to vend age restricted products to that consumer. If the bearer of the RFID tag is over the age limit, the sales person may proceed to add age restricted products to the sales transaction.

The ProductID is saved to the server and saved to the RFID wristband of the consumer 304. In one embodiment the ProductID is saved to the server and saved to the RFID wristband of the consumer. In an alternate embodiment the ProductID and the VendorID are both saved to the server and the RFID wristband of the consumer.

The consumer taps the RFID wristband to a RFID terminal before trying a second beverage (e.g. beer) 305.

The ProductID is saved to the server and saved to the RFID wristband of the consumer 306. In one embodiment the ProductID is saved to the server and saved to the RFID wristband of the consumer. In an alternate embodiment the ProductID and the VendorID are both saved to the server and the RFID wristband of the consumer.

When the consumer leaves the wine booth, the UserID is captured from the RFID wristband and saved to the server; while the VendorID is saved to the RFID wristband of the consumer 307.

Figure 4:
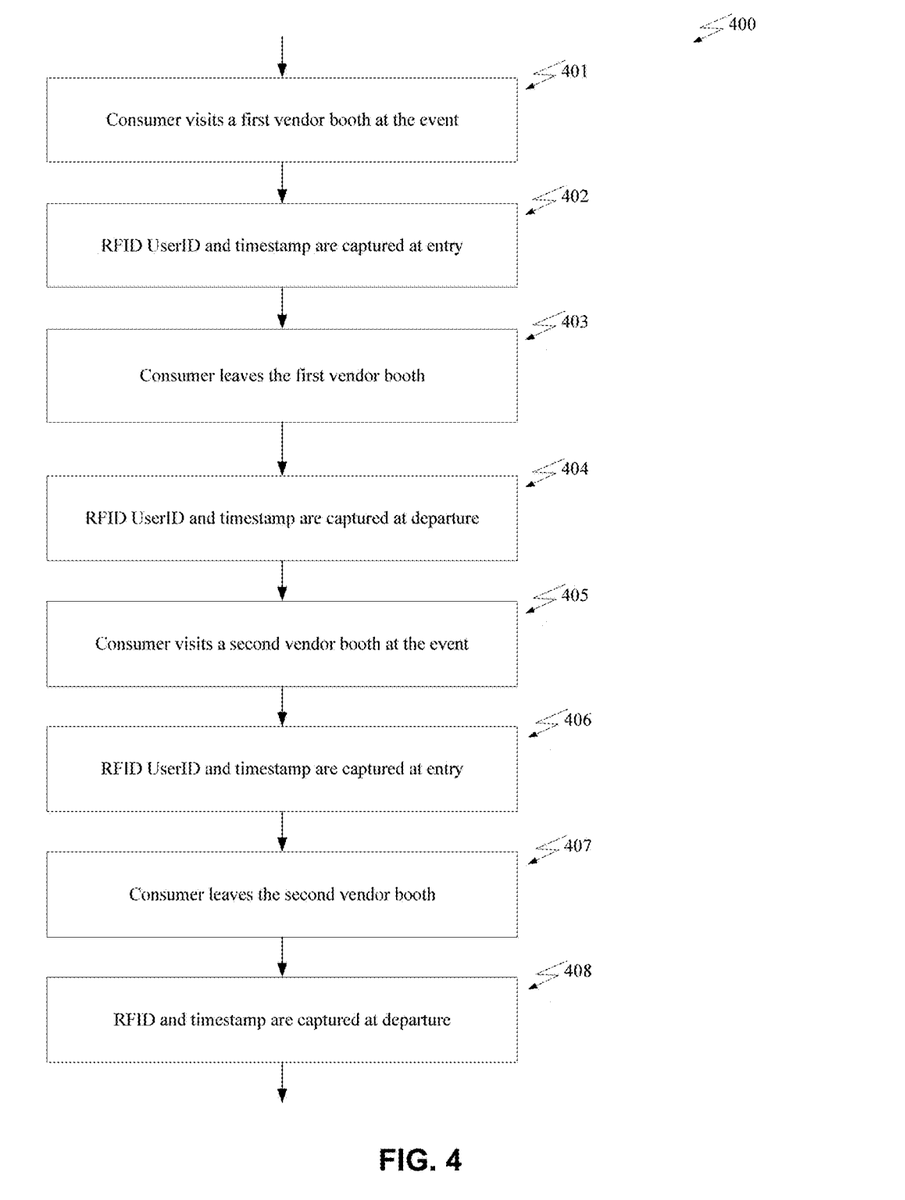
FIG. 4 is a flow diagram illustrating the use of RFID wristbands in development of a timestamped profile of a user's visit to multiple vendor booths at an event.

FIG. 4 shows one embodiment 400. Consumer visits a first vendor booth at the event 401, such as a booth by a local brewery at the wine and cheese festival being held over a long weekend.

The RFID UserID and timestamp are captured at entry 402. The captured UserID and timestamp may be saved to the server or the RFID tag or both.

This information may be first saved to the RFID tag in realtime, but may be uploaded to the server asynchronously. In an alternate embodiment this information may be saved to both the RFID tag and the server in realtime.

The consumer leaves the first vendor booth 403. The RFID UserID and timestamp are captured at departure 404.

The consumer visits a second vendor booth at the event 405, such as a booth by a local cheese producer.

The RFID UserID and timestamp are captured at entry 406.

The consumer leaves the second vendor booth 407. The RFID UserID and timestamp are captured at departure 408.

Both the VendorID and the UserID may be captured and stored on the RFID wristband and the server at the time of entry and at the time of departure. In other alternate embodiments other combinations of VendorIDs and UserIDs may be captured and stored on the RFID wristband, the connected server, the sales terminal, the top-up terminal or other such storage device or mechanism.

Thus by tracking the RFID UserID of a particular consumer over a period of time when attending a fair or a festival, along with the VendorIDs of the booths visited and the ProductIDs of the products purchased or sampled a complete consumer profile can be assembled that reflects the consumer's purchasing and sampling behaviour and preferences during that visit.

The event, e.g., a festival may be divided into one or more zones. The different zones in a festival may be required in order to segregate the consumers based on their age or their payment levels. For example a fair may have an area where alcoholic beverage can be sampled or purchased, that is only accessible to persons aged 19 or over and any products/services being vended in this zone may only be sampled/purchased by these people. The RFID tag may preferably contain this information that defines the zone(s) where the RFID tag is valid. Alternatively the server may also store this information so that when an RFID tag is read by an RFID reader at a sales terminal it can verify the zone restrictions/privileges by connecting to the server and querying UserID of the RFID tag and checking its restrictions/privileges before allowing a sales person to add any products to the sales transaction.

Figure 5:
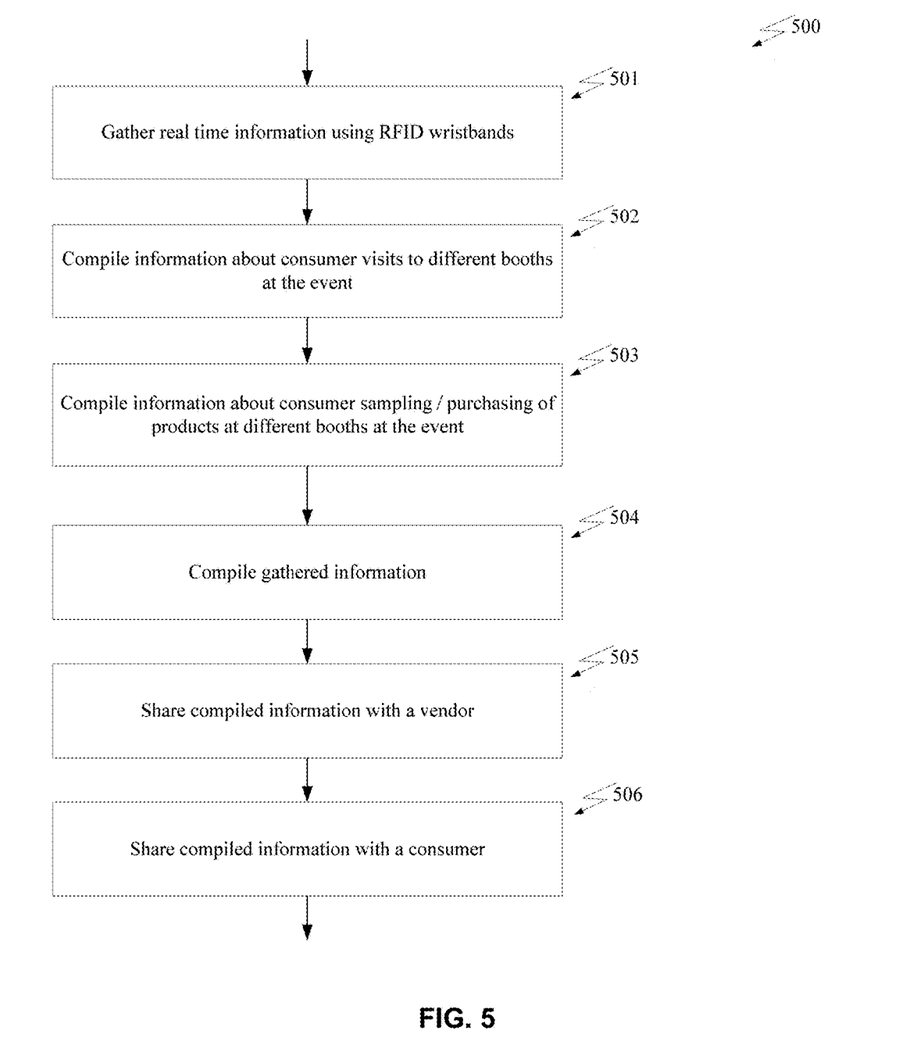
FIG. 5 is a flow diagram illustrating the use of information gathered from RFID wristbands at an event.

FIG. 5 shows one embodiment 500. Real time information is gathered using RFID wristbands 501. Such information may include when consumer entered a booth, what products were sampled or purchased, in what order they were sampled or purchased, and when did the consumer leave the booth.

This information can then be compiled and aggregated about consumer visits to different booths during an event 502. For example a consumer visits a wine and cheese festival and during the visit goes to a cheese outlet booth, then goes to the winery booth and then goes to the beer booth.

Information about consumer sampling of products can also be compiled and aggregated 503. Thus for the example above the said consumer when visiting the wine and cheese festival and during the visit goes to a cheese outlet booth and tries a cream cheese and an aged cheddar cheese; then goes to the winery booth and tries a red wine and a white wine, at lunch visits the beer booth and samples different types of beers.

All of the gathered information can be compiled and aggregated 504.

This compiled information can then be shared with a vendor 505. For example, the vendor may be provided with information about how many consumers visited the vendor's booth over the course of a day, or over the course of an event.

The information about the consumers who visited the booth of a particular vendor may include but is not limited to the following:
  What was the peak time at the booth in terms of traffic
  What was the slow time at the booth in terms of traffic
  When most sales were conducted
  When least sales were conducted
  Average time consumers spent in the booth (by capturing entry time and departure time)
  Average consumer spending at the vendor
  In what sequence consumers visited (which booth was visited first, which booth was visited last etc.)
  Which products were sampled most
  Which products were purchased most
  Which products were sampled least
  Which products were purchased least In some cases, vendors may also be provided with information about consumer visits to other vendors booths, or to the event more generally. This may assist vendors in planning for future years (e.g. which booth locations have the most traffic at which times of day).

The information about a particular consumer who visited the booth of a particular vendor may include but is not limited to the following:
  When did the consumer visit the booth
  Was consumer visit during peak time or during slow time
  How much time did this consumer spend and how it compares to the average time for all consumers who visited this booth
  How much did this consumer spend and how it compares with the average consumer spending at this vendor
  In what sequence did this consumer visit the vendor booth
  Which products were sampled
  Which products were purchased
  Ratio of sampled products to purchased products Where consumer ratings are received, the consumer may also be provided with a list of the samples or vendors the consumer liked best (and/or which samples or vendors other consumers liked best/least).

Compiled information may be sent to the vendor via an attached file in an e-mail, by mailing printed results, or by a link to the compiled information that is accessible over the internet, or other electronic methods conducive to sharing and sending information over the internet.

The compiled information may be shared with a consumer 506. For example, this may be via an attached file in an e-mail, mailing printed results, a link to the compiled information that is accessible over the internet, and other electronic methods conducive to sharing and sending information over the internet.

The information about a particular consumer who visited the event e.g. the festival or fair may include but is not limited to the following:
  How many booths did the consumer visit
  In what order did the consumer visit the booths
  Time spent at each of the booths
  Which products were sampled and or purchased at each booth visited
  How much did the consumer spend in total at the event
  How much did the consumer spend at each booth
  What products were purchased/sampled by the consumer
  What products were most popular at the event
  In what sequence products were sampled at a given booth
  Comparison of consumer time spent at the booth with the average time of all consumers at the same booth
  Comparison of consumer spending at the booth with the average spending of all consumers at the same booth The above are exemplary and not limiting, in fact the intent is to cover all such information that may be relevant and gathered at an event and shared with the vendors or consumers attending the event.

The event (e.g. a fair) may have several sales terminals set up, such as one at each of the participating vendor's booth from where consumers may pay for the sampled products or the purchased products e.g. a beer kiosk from where different types of beers may be sampled or purchased, a cheese kiosk from where cheese and crackers may be sampled and/or purchased etc. The fair may also have one or more RFID tag top-up terminals set up at different locations at the venue so that a consumer may opt to add more balance to the RFID tag if the balance runs low as a consequence of having sampled or purchased several products/services.

In one embodiment the validity of the RFID tag may be checked by reading its UserID and passing this UserID to the server for validation. The server may have a database or a list of all valid UserIDs for the RFID wristbands that are related to an event e.g. a wine and cheese festival. If the RFID tag is valid, the sales person is allowed to vend product(s). If the RFID tag is not valid, then a notification may be displayed and the sales person may be disallowed to vend products. The sales terminal may be returned to an inactive state.

The sales terminal may only be activated for a sales transaction once a valid and non-zero balance RFID tag has been tapped. Thus if the UserID of the RFID tag does not match with any of the UserIDs in the list/database on the server then it is considered that the RFID tag is not valid. Similarly, if the balance associated with the RFID tag is zero or less than the price of the products being sampled or purchased, the sales terminal returns to an inactive state with the RFID reader waiting for the next RFID tag to be read. This prevents a sales person from selling any products to a consumer bearing an invalid and zero balance (or low balance) RFID tag. Preferably there may be a notification that is displayed on the sales terminal notifying the bearer of the RFID tag about the validity and the low balance associated with the RFID tag.

In order to complete the sales transaction the funds are transferred from the consumer's account (balance on the RFID tag) to the vendor's account. The sales terminal returns to an inactive state with the RFID reader waiting for the next scan of an RFID tag to start a new transaction.

The total amount of the sale is displayed. Consumer confirms the sale with a second tap of the RFID tag to the RFID reader. The second tap of the RFID tag to the RFID reader associated with the sales terminal confirms the consumer's intent and willingness to purchase the products/services being vended.

The system checks if it is the same RFID tag as the first tap. When the consumer taps the RFID tag a second time, the RFID tag is read to get the UserID of the RFID tag. The UserID read from the first tap of the RFID tag is compared with the UserID read with the second tap of the RFID tag. If the comparison shows that the UserID read from the first tap of the RFID tag is equal to/same as the UserID read with the second tap then it is confirmed that it is the same consumer who initiated the sales transaction.

If No, the RFID tag of the second tap is different from the RFID tag of the first tap, then a notification is displayed and the sales person is disallowed to vend the product. If the comparison shows that the UserID read from the first tap of the RFID tag is not equal to/or is different from the UserID read with the second tap then it is concluded that a different consumer is trying to finalize the sales transaction. Thus in one embodiment, the sales transaction is disallowed if the UserID from the first RFID tap does not match the UserID of the second RFID tap.

If Yes, the RFID tag of the second tap is the same as the RFID tag of the first tap, then the sales transaction is completed. If the comparison results that the UserID read from the first tap of the RFID tag is equal to/same as the UserID read with the second tap then the sales transaction is completed. In one embodiment in order to complete the sales transaction the funds are transferred from the consumer's account (balance on the RFID) to the vendor's account.

A new balance is written to the RFID tag. If there is any balance left from this instant transaction write the balance to the RFID tag and the server. If the balance is zero, then write 0.00 balance to the RFID tag and the server. With the completion of a sales transaction the sales terminal returns to an inactive state with the RFID reader waiting for the next scan of an RFID tag to start a new sales transaction.

In one embodiment there may be one or more terminals dedicated for RFID tag top-up. The consumer may preferably first be able to check the balance on their RFID tag by tapping the RFID tag at the RFID reader associated with the top-up terminal. Preferably the consumer may add more balance to the RFID tag via the top-up terminal for later use.

The preferred embodiment may provide a graphical user interface utilizing which a consumer may top up the balance on the RFID tag. Preferably there may be a drop down menu or a list with selection radio buttons or any other user friendly method using which a consumer may choose the amount and the payment method for the RFID tag top-up e.g. credit card, bank account etc.

The RFID tag top-up terminal is in an inactive state. When the consumer taps RFID tag on the RFID reader associated with the top-up terminal, the RFID reader reads the RFID tag. In one embodiment the RFID tag top-up terminal is only activated once a valid RFID tag has been tapped at the RFID reader by a consumer.

In one embodiment the validity of the RFID tag is checked by reading its UserID and passing this UserID to the server for validation. The server may have a database or a list of all valid UserIDs for the RFIDs that are related to an event, the associated balances, a list of recent transactions, age and zone restrictions if any amongst other information about the bearer of the RFID tag.

In one embodiment the system checks with the server for the validity of the RFID tag. If the RFID tag is not valid, then a notification is displayed and the operator is disallowed to top-up the RFID tag and the sales terminal is returned to an inactive state.

There may be a person e.g. an operator who assists a consumer with the RFID tag top-up process. Alternatively, the RFID tag top-up terminal may be self-serve where the consumers follow instructions to top-up the RFID tags themselves.

Preferably, the second tap of the RFID tag to the RFID reader associated with the top-up terminal confirms the consumer's intent and willingness to top-up the RFID tag with the amount and type chosen earlier.

The system may check if the RFID tag of the first tap is the same as the RFID tag of the second tap. If the comparison shows that the UserID read from the first tap of the RFID tag is equal to/same as the UserID read with the second tap then the top-up transaction is completed. In one embodiment in order to complete the top-up transaction the funds are transferred from the consumer's account e.g. a credit card to the RFID tag.

The new balance is displayed and written to the RFID tag. In one embodiment the new balance is written to the RFID tag and the server.

In one embodiment the system may write the last transaction details and the balance to the RFID tag. In one embodiment the RFID tag may store the last five transactions, and the balance.

When the RFID tag top-up transaction is complete, the RFID tag top-up terminal is returned to an inactive state with the RFID reader waiting for the next scan of an RFID tag to start a new top-up transaction.

The sales terminal may be a self-serve terminal where the consumer may purchase items directly and add items to a sales transaction. In this case, the consumer starts the sales transaction by first tapping the RFID tag to the RFID reader, adding products to the sales transaction and then finalizing the sale with the second tap of the RFID tag to the RFID reader.

Even if no products were sampled or purchased by a consumer at the event using the RFID wristband, the consumer may have the opportunity to express their intent to purchase or learn more about vendor showcased products by using a LiveClick Station. A LiveClick Station may be an RFID equipped terminal with a graphical user interface e.g. a touchscreen, using which a consumer may choose one or more vendor showcased products and tap their RFID wristband to identify themselves. This establishes a relationship between the consumer and the vendor as a consumer expresses their intent by selecting options like "I am interested in this product" or "I am interested in this product and would like more information about it" etc.

The LiveClick Station may be used during the event or after the event is over. The LiveClick Station product selection information may be used in addition to the information gathered via the sampling and purchasing of different products at various booths during the event.

The details of some or all transactions may be stored on the RFID tag.

In one embodiment the RFID tags are customized before usage. In an alternate embodiment the system and method may use generic RFID tag for example RFID tags having an ICODE SLI2 15693.

One embodiment may use Active Reader Passive Tag (ARPT) system that has an active reader, which transmits interrogator signals and also receives authentication replies from passive RFID tags.

The RFID tags may be embedded in any kind of item/element that is wearable e.g. a wristband, an ankle-band, a pair of sunglasses, or it can be a badge etc.

The unique UserIDs of RFID tags to be used at an event may be stored on a server that is accessible over the network. In the preferred embodiment of the invention the list of unique UserIDs of RFID tags may be available in a CSV (Comma Separated Values) format from the supplier. This CSV file is then uploaded to the server. The system then automatically initializes the RFID tags by creating a unique encryption method for that specific tag and writes the offline information to the memory of the RFID tag when the RFID tag first read by an RFID reader in the system.

Figure 6:
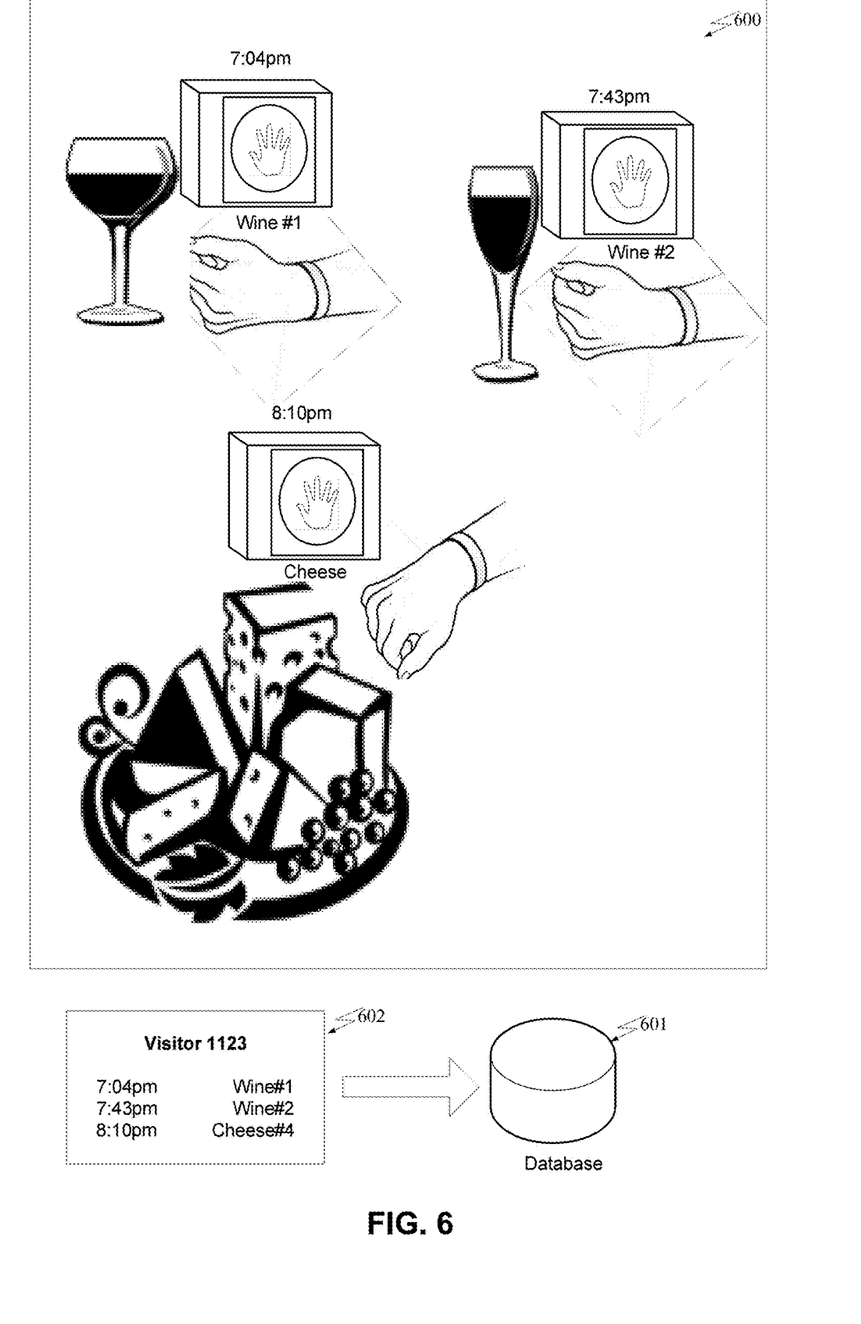
FIG. 6 shows a sample illustration of timestamped product sampling and resulting user profile stored in a database.

FIG. 6 illustrates one embodiment 600 of compiling a timestamped record of a user/consumer visiting a vendor booth. As shown, at 7:04 pm, the consumer sampled Wine 41. At 7:43, the consumer sampled Wine #2. At 8:10 pm, the consumer sampled Cheese #4. Timestamps with related ProductIDs and the UserID of the consumer (here, Visitor 1123) are received and stored each time the wristband is swiped or tapped for a new sample. This log or record 602 may be stored on the RFID tag of the wristband, or in a database 601 in communication with a server that is fed through the terminals in the vendor booth(s).

Figure 7:
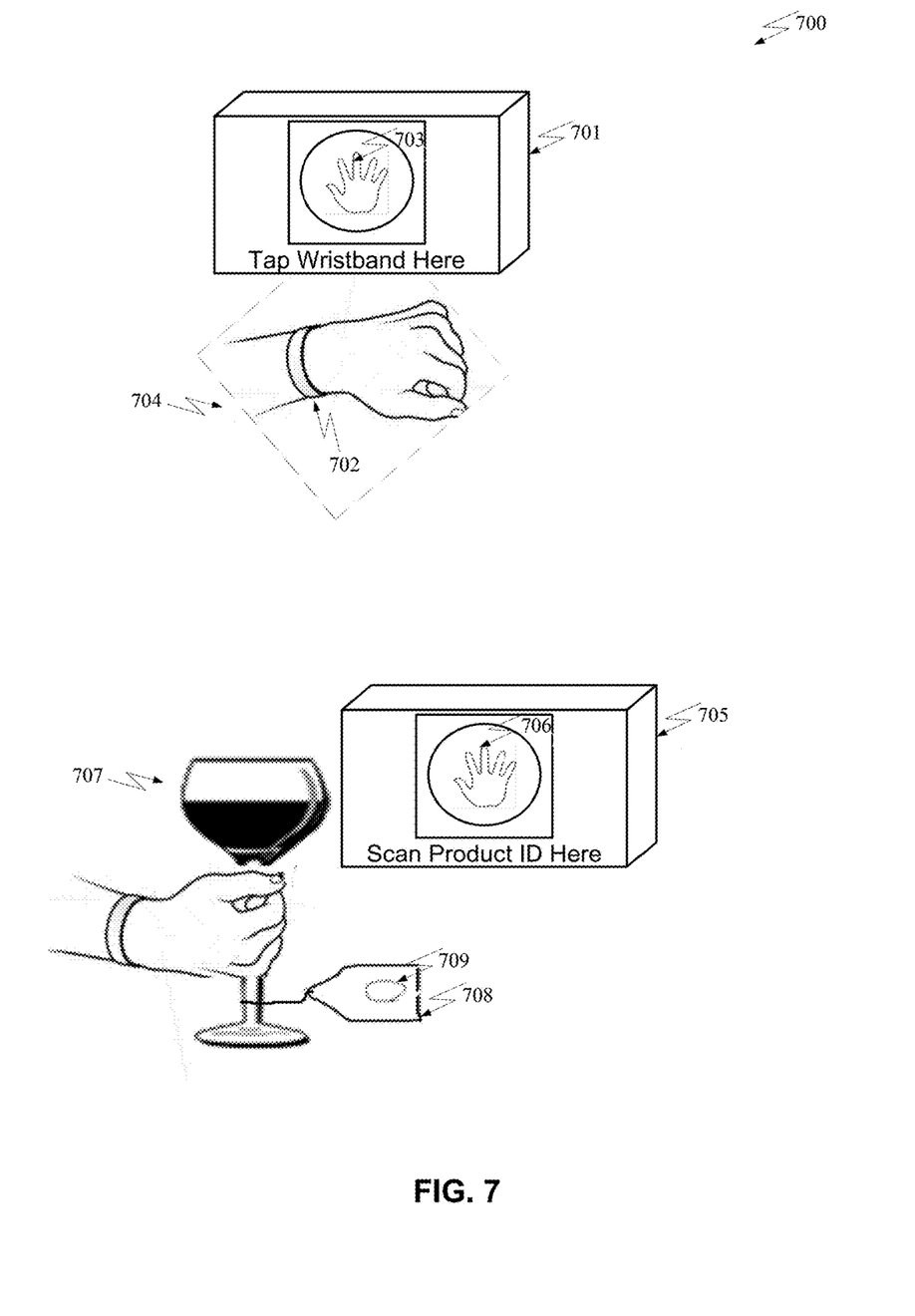
FIG. 7 shows a sample illustration of tapping or scanning an RFID wristband, and an RFID product tag.

FIG. 7 illustrates one embodiment 700 for scanning user and product sample information. A terminal 701 may be provided in a vendor booth for receiving a tap or scan of a RFID tag on a wearable device (e.g. wristband 702) worn by a user 704. The terminal includes a reader 703 capable of reading the UserID of the RFID tag. The same or a different type of terminal 705 having a RFID reader 706 may be used for scanning product information. In one embodiment, a product sample 707 may have an associated physical tag or label 708 (which may, for example, be physically joined to the sample, embedded in or on a container or label, or printed or embedded on an associated card), which may have an embedded RFID tag 709 containing stored data of the ProductID. There may be other methods of reading or associating a ProductID as described elsewhere in this disclosure.

These descriptions exemplify only some of the several possible embodiments of the invention and are not meant to be exhaustive.

It should be understood that although the term application has been used as an example in this disclosure but in essence the term may also imply to any other piece of software code where the embodiments of the invention are incorporated. The software application can be implemented in a stand-alone configuration or in combination with other software programs and is not limited to any particular operating system or programming paradigm described here.

The computer program comprises: a computer usable medium having computer usable program code, the computer usable program code comprises: computer usable program code for presenting graphically to the users options for scrolling via the touch-screen interface.

The examples noted here are only for illustrative purposes and there may be further implementation embodiments possible with a different set of components. While several embodiments are described, there is no intent to limit the disclosure to the embodiment or embodiments disclosed herein. On the contrary, the intent is to cover all practical alternatives, modifications, and equivalents.

What is claimed is:

1. A temporary installation of a system of RFID-based readers and user-worn RFID devices within an event interrogation zone, the installation comprising:
    a plurality of readers, each associated with a displayed product in the event interrogation zone, the product having a unique ProductID that is stored by its associated reader;
    a plurality of user RFID devices issued to users wishing to enter the interrogation zone, each user RFID device comprising:
        an element worn by a user; and
        an attached or embedded RFID tag having stored data representing a unique UserID;
    wherein each reader is programmed for:
        retrieving the UserID of a user from an interaction of the user RFID device with a reader associated with a displayed product, wherein the interaction is an expression of interest in the product by the user bearing the user RFID device;
        communicating data associated with the ProductID to a device or account associated with the retrieved UserID; and
        communicating a timestamp of the interaction to the device or account associated with the retrieved UserID.

2. The installation of claim 1, wherein the interaction includes trying the product associated with the reader.

3. The installation of claim 1, wherein the interaction includes rating the product associated with the reader.

4. The installation of claim 1, wherein the timestamp is added to a log of other timestamped interactions.

5. The installation of claim 1, wherein the interaction includes tapping the RFID device against the reader.

6. The installation of claim 5, wherein the interaction includes tapping the RFID device against the reader two times.

7. The installation of claim 1, wherein the interaction includes bringing the RFID device into proximity of the reader for scanning.

8. The installation of claim 1, wherein the data associated with the ProductID includes a link to allow the user to purchase the product.

9. The installation of claim 1, wherein the data associated with the ProductID includes a link to allow the user to view product availability, options, or inventory.

10. The installation of claim 1, wherein the data associated with the ProductID includes product information relevant to the user based on a stored profile associated with the UserID.

11. The installation of claim 10, wherein the stored profile is also communicated to a retailer/vendor of the product.

12. The installation of claim 10, wherein user purchasing credentials are also communicated to a retailer/vendor of the product.

13. The installation of claim 1, wherein a reader has multiple sensors and the interaction is with only one of the multiple sensors.

14. The installation of claim 13, wherein one sensor is associated with a request for more information about the product.

15. The installation of claim 13, wherein one sensor is associated with a request to purchase the product.

\* \* \* \* \*